United States Patent
Binder et al.

(10) Patent No.: US 6,774,198 B2
(45) Date of Patent: Aug. 10, 2004

(54) PARTIALLY BRANCHED POLYMERS

(75) Inventors: Horst Binder, Lampertheim (DE); Bernd Bruchmann, Freinsheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/312,594

(22) PCT Filed: Jul. 18, 2001

(86) PCT No.: PCT/EP01/08326

§ 371 (c)(1),
(2), (4) Date: Jan. 21, 2003

(87) PCT Pub. No.: WO02/06363

PCT Pub. Date: Jan. 24, 2002

(65) Prior Publication Data

US 2003/0187166 A1 Oct. 2, 2003

(30) Foreign Application Priority Data

Jul. 19, 2000 (DE) ........................ 100 35 119

(51) Int. Cl.[7] ............................................. C08F 120/10
(52) U.S. Cl. .................... 526/323.2; 526/230; 526/320; 526/323; 526/323.1; 526/328.5
(58) Field of Search ................ 526/230, 320, 526/323, 323.1, 323.2, 328.5

(56) References Cited

U.S. PATENT DOCUMENTS

| | | | |
|---|---|---|---|
| 4,117,235 A | | 9/1978 | Taylor |
| 4,870,145 A | * | 9/1989 | Chromecek .............. 526/217 |
| 4,880,867 A | | 11/1989 | Gobel et al. |
| 5,227,432 A | * | 7/1993 | Jung ..................... 525/286 |
| 5,310,807 A | * | 5/1994 | Antonelli et al. ........... 525/286 |
| 5,442,023 A | | 8/1995 | Argyropoulos et al. |
| 5,496,896 A | * | 3/1996 | Alfons ..................... 525/74 |
| 5,534,598 A | | 7/1996 | Guo |
| 6,099,912 A | * | 8/2000 | Borgholte et al. ....... 427/407.1 |
| 6,120,851 A | * | 9/2000 | Borgholte et al. ....... 427/388.2 |

FOREIGN PATENT DOCUMENTS

| | | |
|---|---|---|
| DE | 36 30 187 | 3/1987 |
| DE | 42 03 277 | 8/1993 |
| EP | 0 693 507 | 1/1996 |
| WO | 99 07754 | 2/1999 |
| WO | WO99/46310 | * 9/1999 |

OTHER PUBLICATIONS

Campbell et al. US 2001/0039316 A1 Nov. 8, 2001.*

* cited by examiner

*Primary Examiner*—Helen L. Pezzuto
(74) *Attorney, Agent, or Firm*—Oblon, Spivak, McClelland, Maier & Neustadt, P.C.

(57) ABSTRACT

The present invention relates to partially branched polymers having a number-average molecular weight $M_n$ in the range from 500 to 20 000 daltons and synthesized from ethylenically unsaturated monomers including:

i) from 80 to 99.9% by weight of monoethylenically unsaturated monomers A, and ii) from 0.1 to 20% by weight of monomers B containing at least two nonconjugated ethylenically unsaturated double bonds, the weight fraction of the monomers A and B being based on the total amount of the ethylenically unsaturated monomers that constitute the polymer.

13 Claims, No Drawings

PARTIALLY BRANCHED POLYMERS

The present invention relates to partially branched polymers having a number-average molecular weight $M_n$ in the range from 500 to 20 000 daltons.

Low molecular weight polymers, i.e., polymers having number-average molecular weights of 20 000 daltons maximum, are of interest for a large number of applications, examples including the preparation of coating compositions in the paints field, the preparation of paper coating compositions, printing inks, adhesives, and floor polishes. In the aforementioned applications they are frequently used as cobinders or auxiliaries. Furthermore, low molecular weight polymers are employed as industrial waxes and also as additives for motor fuels and oils, whether as detergents or as thickeners. An important advantage of low molecular weight polymers over their higher molecular weight homologs is the lower viscosity of these polymers and their solutions, which generally means that less solvent is expended in their processing.

An important class of low molecular weight polymers are those known as functionalized polymers, containing two or more reactive functional groups. Reactive functional groups are those functional groups which are capable of forming bonds with other functional groups at room temperature or on heating. They are therefore used as building blocks in the preparation of polymers of higher molecular weight. For example, low molecular weight polymers functionalized with hydroxyl groups are used as building blocks in the preparation of polyurethanes and polyesters. Furthermore, functionalized polymers are used as a reactive component in thermosettable coating compositions and also in the reaction injection molding (RAM) process.

U.S. Pat. No. 5,534,598 discloses low molecular weight acrylic polymers which are derived from allyl alcohols or propoxylated allyl alcohols and which therefore include OH functional groups. U.S. Pat. No. 4,117,235 and DE 42 03 277 disclose processes for preparing low molecular weight polymers which may contain reactive functional groups.

The prior art low molecular weight polymers based on ethylenically unsaturated monomers generally have a linear structure, having been prepared using exclusively monoethylenically unsaturated monomers. Polyethylenically unsaturated monomers have not been used to date to prepare such low molecular weight polymers on account of the fact that they lead to a rapid buildup in molecular weight and, in extreme cases, to the development of a high molecular weight, three-dimensional network.

For example, DE 36 30 187 describes copolymers based on from 70 to 99.5% by weight of diethylene glycol monomethacrylate and from 0.5 to 30% by weight of esters and/or amides of acrylic acid or of methacrylic acid, containing from 0.1 to 2% by weight of a crosslinking bifunctional monomer in copolymerized form. The polymers obtained by polymerization at low temperatures, e.g. 60° C., are high molecular weight networks, which combined with the hydrophilic monomer bases results in the polymers having a high level of swellability by water.

It is an object of the present invention to provide new polymers.

We have found that this object is achieved by purposively copolymerizing ethylenically unsaturated monomers including up to 20% by weight of monomers containing at least two nonconjugated ethylenically unsaturated double bonds to prepare low molecular weight polymers at least some of whose chains contain one or more branching sites (partially branched polymers).

The present invention accordingly provides partially branched polymers having a number-average molecular weight $M_n$ in the range from 500 to 20 000 daltons and synthesized from ethylenically unsaturated monomers including i) from 80 to 99.9% by weight and preferably from 90 to 99% by weight of monoethylenically unsaturated monomers A, and ii) from 0.1 to 20% by weight and preferably from 1 to 10% by weight of monomers B containing at least two nonconjugated ethylenically unsaturated double bonds, the weight fraction of the monomers A and B being based on the total amount of the ethylenically unsaturated monomers that constitute the polymer.

The present invention additionally provides a process for preparing such polymers, which comprises copolymerizing the aforementioned monomers A and B in the specified amounts at temperatures above 150° C., preferably 160° C., and in particular above 170° C.

The molecular weights $M_n$ indicated here and below are number-average molecular weights as may be determined, for example, by exploiting the colligative properties of the polymers, e.g., by vapor pressure or membrane osmosis, by ebullioscopy, by cryoscopy or by gel permeation chromatography. The $M_n$ figures stated here were determined by means of gel permeation chromatography (GPC) using polystyrene standards. The process used is described, for example, in DIN 55672-1.

The polymers of the invention preferably have a number-average molecular weight $M_n$ in the range from 700 to 10 000 daltons and in particular in the range from 1 000 to 6 000 daltons.

The monoethylenically unsaturated monomers A used to prepare the polymers of the invention include compounds containing an ethylenically unsaturated polymerizable double bond. Preferably at least 60% by weight and in particular at least 80% by weight of the monomers A have a polymerizable double bond in the form of an acrylic or methacrylic group.

In one preferred embodiment the polymers of the invention contain a reactive group. Reactive groups are functional groups suitable for crosslinking reactions, whether at room temperature or at elevated temperature. They include carboxyl, ketone, aldehyde, isocyanate, amino and, in particular, hydroxyl and epoxy groups. Monomers containing reactive functional groups are therefore referred to below as monomers A1 and those without reactive functional groups are referred to as monomers A2. In this preferred embodiment of the present invention, the proportion of the monomers A1 among the overall amount of the monomers is generally from 10 to 80% by weight and preferably from 20 to 70% by weight.

Preferred monomers A1 are esters of acrylic acid and of meth-acrylic acid that contain OH groups or oxirane groups. Examples of OH-bearing esters of acrylic acid and/or of methacrylic acid are the $C_1$–$C_8$ hydroxyalkyl (meth)acrylates such as 2-hydroxyethyl acrylate, 2- or 3-hydroxypropyl acrylate, 2-hydroxybutyl acrylate, 4-hydroxybutyl acrylate, 6-hydroxyhexyl acrylate, and the corresponding methacrylates. Examples of esters of acrylic acid and of methacrylic acid that carry oxirane groups are glycidyl acrylate, glycidyl methacrylate, and 2,3-epoxycyclohexyl or 3,4-epoxycyclohexyl acrylate or methacrylate. Examples of carboxyl monomers are acrylic acid and methacrylic acid and also, furthermore, fumaric acid, maleic acid, and the monoesters of these acids with $C_1$–$C_8$ alkanols. Examples of amino monomers A1 are 2-aminoethyl acrylamide, 2-aminoethyl methacrylamide, 2-amino-ethyl acrylate and methacrylate, and the corresponding mono- and di-$C_1$–$C_4$ alkylamino compounds.

Examples of the preferred monomers A2 are $C_1$–$C_{20}$ alkyl acrylates and methacrylates and $C_5$–$C_{10}$ cycloalkyl acrylates and methacrylates, it being possible for the aforementioned compounds to be halogenated in the alkyl and/or cycloalkyl moiety or to contain one or two nonadjacent oxygen atoms and/or imino groups instead of a $CH_2$ group.

Examples of such monomers include the following: methyl acrylate, ethyl acrylate, n-propyl acrylate, isopropyl acrylate, n-butyl acrylate, isobutyl acrylate, tert-butyl acrylate, n-amyl acrylate, isoamyl acrylate, n-hexyl acrylate, 2-ethylbutyl acrylate, 2-ethylhexyl acrylate, 2-propylheptyl acrylate, lauryl acrylate, stearyl acrylate, cyclopentyl acrylate, cyclohexyl acrylate, 3-methoxybutyl acrylate, 2-methoxybutyl acrylate, 2-ethoxyethyl acrylate, tetrahydrofuryl acrylate, and the corresponding esters of methacrylic acid. Further suitable monomers A2 containing acrylic or methacrylic groups are phenyl acrylate, benzyl acrylate, phenethyl acrylate, 2-phenoxyethyl acrylate, acrylamide, methacrylamide, N-methylacrylamide, N-ethylacrylamide, N,N-dimethylacrylamide, N,N-diethylacrylamide, N-phenylacrylamide, oxazolidinylethyl acrylate, methyl α-chloroacrylate, methyl 2-cyano-acrylate, 2-nitro-2-methylpropyl acrylate, and the corresponding methacrylates and methacrylamides.

Further suitable monomers A2 include vinylaromatic monomers such as styrene, α-methylstyrene, tert-butylstyrene, vinyltoluenes, and chlorostyrenes. Further monomers A2, moreover, are the vinyl esters and allyl esters of aliphatic carboxylic acids having from 1 to 20 carbon atoms, such as vinyl acetate, vinyl propionate, vinyl valerate, vinyl versatate (vinyl esters of Versatic® acids), vinyl laurate and vinyl stearate, and also vinyl halides such as vinyl chloride and vinylidene chloride, vinyl ethers of aliphatic $C_1$–$C_{20}$ alcohols such as vinyl isobutyl ether, vinyl dodecyl ether and vinyl octadecyl ether, and also heterocyclic vinyl compounds such as vinylpyrrolidone, vinylcaprolactam, vinylimidazole, vinylpyridines, and the like.

The proportion of the monomers A2 among the total amount of the monomers that constitute the polymer is preferably at least 20% by weight and in particular at least 30% by weight. In general it will not exceed 99.9% by weight, preferably 99% by weight. Where monomers A1 are present it will in particular not exceed 90% by weight and with particular preference will not exceed 80% by weight.

Among the monomers B, which contain at least two nonconjugated double bonds, preference is given to those compounds in which at least one, preferably at least two, and in particular all of the double bonds are present in the form of acrylic and/or methacrylic acid groups. In particular, at least 80% by weight of the monomers B, and preferably all monomers B, are selected from those monomers B in which the polymerizable double bonds are present in the form of acrylate and/or methacrylate groups. Examples of such monomers B are derived from diols or polyols that have been at least doubly esterified with acrylic acid and/or methacrylic acid. They include 1,2-ethanediol diacrylate, 1,3-propanediol diacrylate, 1,4-butanediol diacrylate, 1,6-hexanediol diacrylate, diethylene glycol diacrylate, triethylene glycol diacrylate, dipropylene glycol diacrylate, and tripropylene glycol diacrylate, trimethylolpropane di- and triacrylate, pentaerythritol tri- and tetraacrylate, and also the corresponding methacrylate compounds.

Further suitable monomers B include the vinyl, allyl and methallyl esters of ethylenically unsaturated carboxylic acids, especially of acrylic acid and of methacrylic acid, such as allyl (meth)acrylate, methallyl (meth)acrylate, cyclohexenyl acrylate and methacrylate, and also dihydrodicyclopentadienyl acrylate and methacrylate, and also the vinyl, allyl and methallyl ethers of polyols, such as butanediol divinyl ether, butanediol diallyl ether, and trimethylolpropane triallyl ether. Further monomers B that may be mentioned by way of example include diallyl phthalate, N,N-divinyl- and N,N-diallylimidazolinone, N,N-divinylurea and N,N-diallylurea, and divinylbenzene.

The polymers of the invention are prepared by free-radical copolymerization of the monomers A and B in the presence of a polymerization initiator. In accordance with the invention the polymerization may be conducted in bulk or in solutions.

The polymerization temperature is generally at least 170° C. In general the polymerization temperature will not exceed 300° C., preferably 250° C., and in particular 220° C.

Suitable polymerization initiators include in principle all compounds which are able to trigger a free-radical polymerization of ethylenically unsaturated monomers. The polymerization initiators are preferably selected from organic hydroperoxides, azo esters and organic peroxides, the last-mentioned being particularly preferred.

Examples of organic hydroperoxides are cumene hydroperoxide, tert-amyl hydroperoxide, tert-butyl hydroperoxide, and diisopropylbenzyl monohydroperoxide. An example of azo esters is 2,2'-azodi(2-acetoxy)propane. Preferred organic peroxides are those in which the peroxy group is attached to tertiary carbon atoms, such as dicumyl peroxide, tert-butyl cumyl peroxide, di-tert-butyl peroxide, di-tert-amyl peroxide, and 2,5-dimethyl-2,5-di(tert-butylperoxy)hexane.

In the process of the invention the initiator is employed preferably in an amount of from 1 to 6% by weight and in particular from 2 to 4% by weight, based on the monomers to be polymerized. It is also possible to employ larger amounts of polymerization initiator, for example, up to 8% by weight, based on the monomers to be polymerized. In that case, generally, polymerization will be conducted at somewhat lower temperatures, which preferably will not fall below a temperature of 150° C.

The polymerization may of course also be conducted in the presence of polymerization regulators (chain transfer agents). These include compounds containing SH groups, and halogenated hydrocarbons such as chloroform, bromoform or carbon tetrachloride. Furthermore, alcohols which may be used as solvents in the process of the invention may act to a smaller extent as chain regulators. Preferably, the polymerization process of the invention is conducted in the absence of chain regulators, apart from the aforementioned alcohols.

Solvents are used, where intended, in amounts of up to 50% by weight, in particular up to 30% by weight, based on the overall weight of the monomers. Examples of suitable solvents are alcohols, e.g. n-propanol, isopropanol, n-butanol, isobutanol, ether alcohols such as ethyl glycol ether, ethyl diglycol ether, ethers such as ethylene glcyol dimethyl ether, diethylene glycol dimethyl ether, triethylene glycol dimethyl ether, esters such as butyl acetate, ketones such as methyl amyl ketone, aromatic alcohols such as benzyl alcohol, methylbenzyl alcohol, cumene alcohols, and also aromatic and aliphatic hydrocarbons such as toluene, xylene, ethylbenzene, cumene, diisopropylbenzene, diphenylmethane, tetralin or decalin.

The process of the invention is generally conducted under superatmospheric pressure, because the starting materials are volatile at the reaction temperatures. In practice, the reaction is carried out under the autogenous vapor pressure of the polymerization mixture at reaction temperature.

The polymerization may be conducted continuously or discontinuously in the reaction vessels appropriate for the purpose. Appropriate polymerization vessels for the discontinuous conduct of the polymerization are customary stirred tank reactors which are preferably designed for working under superatmospheric pressure.

The discontinuous implementation of the process of the invention may be configured as a batch, semibatch or feed process. In the case of the batch process, the monomers to be polymerized, the polymerization initiator and any solvent envisaged are introduced into the polymerization reactor and heated to polymerization temperature, this temperature being maintained until the desired conversion has been reached. In the case of the semibatch process, some of the polymerization initiator and any solvent desired is charged to the reactor in the monomers intended for polymerization and this mixture is heated to polymerization temperature, after which the remaining amount of initiator is added in the course of the polymerization.

In the case of the feed process, solvent and, if desired, a portion of the monomers to be polymerized and, if desired, a portion of the polymerization initiator are charged to the polymerization vessel, but preferably do not represent more than 20% of the monomers to be polymerized and of the initiator required; the mixture is heated to polymerization temperature, and then the remaining amounts of polymerization initiator and the monomers to be polymerized are added under polymerization conditions. The rate of addition of the monomers to be polymerized and of the initiator is guided of course by the polymerization rate, the heat of polymerization which is released, and the dissipation of heat from the polymerization vessel. The feed period is generally in the range from 10 minutes to 4 hours and preferably in the range from 30 minutes to 2 hours. It is commonly followed by a postpolymerization phase for the purpose of completing the conversion. This may last several minutes, e.g., from 10 to 20 minutes, up to 5 h, and will preferably not exceed 2 h.

Besides stirred tank reactors, suitable polymerization vessels for the continuous implementation of the process of the invention include tube reactors, loop reactors, annular gap reactors, preferably those having an annular gap with a width of from 0.5 to 10 mm, as described for example in DE 42 03 277 and DE 42 03 278. Reference is hereby made to those documents. Annular gap reactors are preferred for the implementation of the process of the invention. Examples of suitable annular gap reactors also include those where the conditions for Taylor vortex flow are met. Such reactors are described, for example, in DE-A 198 28 742, which is likewise fully incorporated herein by reference.

In order to implement the continuous configuration of the process of the invention, the starting materials will generally be fed to the polymerization reactor via separate feed streams or, preferably, as a mixture of initiator, monomers, and where appropriate, solvent, and the resulting polymer will be removed continuously. Depending on the reactivity of the monomers to be polymerized, the desired degree of conversion, and the reactor geometry, the average residence time of the reaction mixture to be polymerized in the reactor is from 1 minute up to 2 hours and in particular is in the range from 2 minutes to 0.5 hour.

In this context it has proven appropriate to recycle part of the product stream removed from the reactor back into the polymerization reactor together with fresh monomers and initiator. The ratio of recycled product stream to the amount of the freshly supplied monomers+initiator is also referred to as the return ratio and is preferably in the range from 5 to 30.

Subsequent to the polymerization it is common to provide for removal of the unreacted monomers, any volatile byproducts, any initiator decomposition products present, and the solvents used where appropriate. Suitably for this purpose it is possible to employ one or more thin-film evaporators which are operated continuously and are preferably connected in series. The monomers separated off, and any solvents, may of course be returned to the process. Where appropriate, byproducts such as initiator decomposition products and unwanted oligomers may be separated off beforehand in a separate process step.

The polymers obtained by the process of the invention, unlike crosslinked polymers, are soluble in a range of organic solvents, which is an indicator of their low molecular weight. Suitable solvents for the polymers of the invention are, for example, ketones such as acetone, methyl ethyl ketone and cyclohexanone, aromatic hydrocarbons such as xylenes and toluene or mixtures thereof, alcohols such as ethanol, n-propanol, isopropanol, n-butanol and isobutanol, ether alcohols, e.g. ethylene glycol monomethyl ether, or relatively high-boiling petroleum fractions having boiling points >140° C., and also mixtures of the aforementioned solvents.

The branched polymers of the invention differ from the polymers of comparable molecular weight known to date in the presence of defined branching sites. The fraction of branching sites depends on the amount of the monomers B used and is generally in the range from 0.01 mol to 1 mol and preferably in the range from 0.05 mol to 0.5 mol/kg.

The partially branched polymers prepared by the process exhibit improved weathering stability, for a given molecular weight, relative to the linear polymers of similar monomer compositions.

As a result of the fact that the branching of the chains was formed right in the low molecular weight structure, it is possible using the appropriate cocrosslinkers to use them to synthesize macropolymers having very high flexibility. This high flexibility is important, for example, in connection with the coating of glass fiber cables (primary coating, secondary coating) by means of UV-sensitive coating materials, or with the preparation of polyurethane foams.

Depending on the nature of the copolymerized monomers A, the polymers of the invention are suitable for example as binders for coatings such as paints, protective coatings, printing inks, adhesives or paper coating compositions, and also as building blocks in thermosettable coating systems and in polyesters and polyurethanes. The hydroxy-functionalized polymers of the invention are used in particular in the preparation of polyurethanes and with particular preference in the preparation of polyurethane foams based on aliphatic isocyanates.

The examples which follow are intended to illustrate the invention without, however, restricting it.

I. Analysis

The molecular weights were determined by means of GPC using polystyrene standards in accordance with DIN 55672-1. The polydispersity (ratio of weight-average molecular weight $M_w$ to number-average molecular weight $M_n$) was calculated from these weights.

The viscosity figures were determined on undiluted samples of the polymers at the stated temperatures using an MC 100 viscometer from Physica.

The OH number (mg KOH per g polymer) was determined by titrating an acetalized sample with a 0.5 N ethanolic KOH solution. The acid number of the unacetalized sample was determined beforehand, likewise by titration with 0.5 N ethanolic KOH solution, and taken into account when calculating the OH number.

The epoxide value [mol/kg polymer] was determined, following addition of acetic acid, by titration with N-cetyl-N,N,N-trimethylammonium bromide.

The solubility investigations were conducted by dissolving 2 g of polymer in 1 ml of the respective solvent. In this regime, a polymer was considered soluble if it had dissolved almost completely within 30 minutes.

II. Discontinuous preparation in a pressure vessel

EXAMPLE 1

An oil-heated 6 l pressure vessel equipped with thermometer and pressure sensor and with two separate metered feed units was charged with 600 ml of solvent, which was then heated to 190° C. Over the course of one hour, the monomer mixture was added via feed stream 1 and the initiator solution via feed stream 2. After the end of the additions, the temperature was maintained for one hour, after which the reaction mixture was cooled to 60° C. and diluted with solvent with a solids content from about 50 to 60% by weight. The volatile constituents were removed from the resultant polymer solution in a thin-film evaporator at 180° C. under a pressure of <20 mbar.

The monomer feed stream contained 1 500 g of hydroxyethyl acrylate, 1 350 g of ethylhexyl acrylate and 150 g of hexanediol diacrylate. The initiator feed used was a solution of 60 g of di-tert-amyl peroxide in 150 g of isobutanol.

The solids content of the polymer was 99.6% and was determined by heating the sample at 220° C. for 15 minutes. The number-average molecular weight $M_n$ was 2 362 g/mol. The OH number of the polymer was 219 mg KOH/g. The viscosity at 30° C. was 480 Pa.s and at 100° C. was 1.9 Pa.s.

The polymer was soluble in acetone, ethanol and isopropanol.

EXAMPLE 2

Following the instructions for Example 1, 3 kg of a homogeneous mixture of 50 parts by weight of hydroxyethyl acrylate, 47 parts by weight of ethylhexyl acrylate and 3 parts by weight of hexanediol acrylate were polymerized at 190° C. The initiator solution contained 120 g of di-tert-amyl peroxide dissolved in 150 g of isobutanol. The degree of conversion found was 99.4%.

The molecular weight of the resulting polymer, $M_n$, was 1 290 g/mol. The OH number of the polymer was 213 mg KOH/g. The viscosity of the polymer at 30° C. was 36 Pa.s and at 100° C. was 1.67 Pa.s.

The polymer was soluble in acetone, ethanol and isopropanol.

III. General instructions for continuous polymerization in an annular gap reactor The polymerization vessel used was an annular gap reactor having a gap width of 4 mm, a volume (in the reaction space) of 1.5 l, and a rotor (diameter 96 mm) on which ribs were mounted to promote mixing. The reactor also had means for metering the monomers, for product recycling, and for product withdrawal. The means for product recycling and for monomer supply were configured as double pipes, with the monomer being supplied by way of the inner pipe and the product being recycled by way of the outer pipe.

Polymerization was conducted at an internal temperature of 190° C. and a rotor speed of 200 rpm. The monomer throughput, D, was 13 kg/h with a recycled product flow R of 260 kg/h, corresponding to a return ratio R/D of 20. Following the polymerization, the melt was devolatilized at 180° C. in a thin-film evaporator.

EXAMPLE 3

A monomer mixture of 23 parts by weight of glycidyl methacrylate, 55 parts by weight of methyl methacrylate, 11 parts by weight of n-butyl acrylate, 8 parts by weight of methyl acrylate and 3 parts by weight of hexanediol acrylate was mixed homogeneously in a stock vessel. Immediately before introducing this mixture into the annular gap reactor, 2 parts by weight of di-tert-amyl peroxide (as a 50% strength by weight solution in xylene) were added and the whole was mixed in a downstream Sulzer mixer.

Following polymerization and subsequent devolatilization, a polymer was obtained which had the following properties:

Molecular weight $M_n$=1 622 g/mol

Polydispersity $(M_w/M_n)$=2.45

Epoxide value=0.1455

The polymer was soluble in xylene and toluene.

EXAMPLE 4

The procedure described for Example 3 was used to polymerize 23 parts by weight of glycidyl methacrylate, 55 parts by weight of methyl methacrylate, 11 parts by weight of butyl acrylate, 5 parts by weight of methyl acrylate and 6 parts by weight of hexanediol diacrylate. Following subsequent devolatilization, a polymer was obtained which had the following properties:

Molecular weight $M_n$=1 751 g/mol

Polydispersity $(M_w/M_n)$=3.98

Epoxide value=0.1420

The product was soluble in xylene and toluene.

EXAMPLE 5

A 5 l pressure vessel with stirrer, configured for continuous polymerization, was used for continuous polymerization at 190° C. and 10 bar internal pressure of a mixture of 50 parts by weight of 2-hydroxyethyl acrylate, 47 parts by weight of n-butyl acrylate and 3 parts by weight of hexanediol diacrylate in the presence of 4 parts by weight of di-tert-amyl peroxide. The throughput (monomer mixture+initiator) was 10 kg/h. Following the polymerization, the product removed was freed from volatile constituents in a thin-film evaporator at 190° C. and a pressure <30 mbar.

The polymer had the following properties:

Molecular weight $M_n$=1 480 g/mol

Polydispersity $(M_w/M_n)$=4.46

OH number=215 KOH/g

The viscosity of an undiluted polymer sample was 67 Pa.s at 30° C. and 1.75 Pa.s at 100° C.

COMPARATIVE EXAMPLE 1

Example 1 was repeated with the following differences: the polymerization temperature was 60° C. Instead of di-tert-amyl peroxide, 3 parts by weight of azobisisobutyronitrile (based on monomers) were used as initiator. Two hours after the beginning of polymerization, the reaction mixture underwent crosslinking and there was phase separation into polymer phase and solvent phase. The resulting polymer was insoluble in ethanol, isopropanol, acetone and xylene.

COMPARATIVE EXAMPLE 2

Comparative example 1 was repeated with the following differences: 0.2 part by weight rather than 3 parts by weight of azobisisobutyronitrile was used as initiator. After just one hour, a product was obtained which was no longer soluble in organic solvents.

We claim:

1. A process for producing partially branched polymers having a number-average molecular weight Mn in the range from 500 to 10 000 daltons and synthesized from ethylenically unsaturated monomers including:
   i) from 90 to 99.9% by weight of monoethylenically unsaturated monomers A, and
   ii) from 1 to 10% by weight of monomers B containing at least two nonconjugated ethylenically unsaturated double bonds, the weight fraction of the monomers A and B based on the total amount of the ethylenically unsaturated monomers that constitute the polymer, by free-radically copolymerizing the monomers A and B in bulk or in solution, said process comprising carrying out the copolymerization in the presence of from 1 to 6% by weight, based on the overall amount of monomers A and B, of at least one polymerization intiator at temperatures in the range from 190 to 250° C.

2. The process as claimed in claim 1, wherein the monomers A include at least one monomer A1 containing at least one reactive group and at least one monomer A2 without a reactive group.

3. The process as claimed in claim 2, wherein the monomers A1 are selected from the group consisting of esters of acrylic acid and esters of methacrylic acid that carry OH groups or oxirane groups.

4. The process as claimed in claim 2, wherein the proportion of the monomers A1 among the overall amount of the monomers that constitute the polymer is from 10 to 80% by weight.

5. The process as claimed in claim 1, wherein the monomers B are selected from the group consisting of diols esterified at least doubly with acrylic acid or methacrylic acid and polyols esterified at least doubly with acrylic acid or methacrylic acid.

6. The process as claimed in claim 1, wherein the polymerization is carried out in the absence of a polymerization regulator.

7. The process as claimed in claim 1, wherein the polymerization initiator is selected from the group consisting of peroxides and hydroperoxides.

8. The process as claimed in claim 1, wherein the monomers to be polymerized are supplied continuously to the polymerization zone and the polymer formed is taken off continuously from the polymerization zone.

9. A process for producing partially branched polymers having a number-average molecular weight $M_n$ in the range from 500 to 10 000 daltons and synthesized from ethylenically unsaturated monomers including:
   i) from 90 to 99.9% by weight of monoethylenically unsaturated monomers A, comprising, based upon the overall amount of monomers A respectively, from 10 to 79% by weight of monomers A1, selected from the group consisting of esters of acrylic acid and esters of methacrylic acid that carry OH groups, and from 20 to 89% by weight of monomers A2, selected from the group consisting of $C_1$–$C_{20}$ alkyl acrylates, $C_5$–$C_{10}$ cycloalkyl acrylates, $C_1$–$C_{20}$ alkylmethacrylates and $C_5$–$C_{10}$ cycloalkylmethacrylates,
   ii) from 1 to 10% by weight of monomers B containing at least two nonconjugated ethylenically unsaturated double bonds selected from the group consisting of diols esterified at least doubly with acrylic acid or methacrylic acid and polyols esterified at least doubly with acrylic acid or methacrylic acid, the weight fraction of the monomers A, A1, A2 and B based on the total amount of the ethylenically unsaturated monomers that constitute the polymer, by free-radically copolymerizing the monomers A and B in bulk or in solution, said process comprising carrying out the copolymerization in the presence of from 1 to 6% by weight, based on the overall amount of monomers A and B, of at least one polymerization intiator at temperatures in the range from 190 to 250° C.

10. The process as claimed in claim 9, wherein the polymerization is carried out in the absence of a polymerization regulator.

11. The process as claimed in claim 9, wherein the monomers to be polymer zed are supplied continuously to the polymerization zone and the polymer formed is taken off continuously from the polymerization zone.

12. The process as claimed in claim 1, wherein the temperature range is 190 to 220° C.

13. The process as claimed in claim 9, wherein the temperature range is 190 to 220° C.

* * * * *